US012610408B2

(12) United States Patent　　　(10) Patent No.:　US 12,610,408 B2
Hao et al.　　　　　　　　　　　　(45) Date of Patent:　　Apr. 21, 2026

(54) METHOD FOR SIGNALING INTERACTION IN 5G SPACE-GROUND INTEGRATED HETEROGENEOUS NETWORK ARCHITECTURE

(71) Applicant: ZHEJIANG LAB, Hangzhou City (CN)

(72) Inventors: Nan Hao, Hangzhou City (CN); Xingming Zhang, Hangzhou City (CN); Hong Zhang, Hangzhou City (CN); Jun Zhu, Hangzhou City (CN); Xiangming Zhu, Hangzhou City (CN); Ning Zheng, Hangzhou City (CN)

(73) Assignee: ZHEJIANG LAB, Hangzhou City (CN)

( * ) Notice: Subject to any disclaimer, the term of this patent is extended or adjusted under 35 U.S.C. 154(b) by 329 days.

(21) Appl. No.: 18/259,572

(22) PCT Filed: Mar. 3, 2023

(86) PCT No.: PCT/CN2023/079482
§ 371 (c)(1),
(2) Date: Jun. 27, 2023

(87) PCT Pub. No.: WO2024/103572
PCT Pub. Date: May 23, 2024

(65) Prior Publication Data
US 2025/0031256 A1　　Jan. 23, 2025

(30) Foreign Application Priority Data

Nov. 14, 2022　(CN) ......................... 202211418844.9

(51) Int. Cl.
*H04W 76/12*　　　(2018.01)
*H04W 12/084*　　(2021.01)
(Continued)

(52) U.S. Cl.
CPC ......... *H04W 76/12* (2018.02); *H04W 12/084* (2021.01); *H04W 76/11* (2018.02); *H04W 76/25* (2018.02)

(58) Field of Classification Search
CPC ..... H04W 76/12; H04W 76/25; H04W 76/11; H04W 12/084; H04W 60/00; H04W 84/06; Y02D 30/70
See application file for complete search history.

(56) References Cited

U.S. PATENT DOCUMENTS

2017/0332421 A1 * 11/2017 Sternberg .............. H04W 72/51
2022/0272757 A1 　 8/2022 Liu
2024/0323824 A1 * 9/2024 He ........................ H04W 48/16

FOREIGN PATENT DOCUMENTS

CN　　108199764 A　　6/2018
CN　　112994775 A　　6/2021
(Continued)

OTHER PUBLICATIONS

ISA State Intellectual Property Office of the People's Republic of China, International Search Report Issued in Application No. PCT/CN2023/079482, Jun. 27, 2023, WIPO, 6 pages. (Submitted with Machine Translation).

(Continued)

*Primary Examiner* — Jianye Wu
(74) *Attorney, Agent, or Firm* — McCoy Russell LLP

(57) ABSTRACT

A method of signaling interaction in 5G space-ground integrated heterogeneous network architecture is provided, which enables publicly available data for trusted satellite discovery to be registered to the 5G core network based on the function framework of the 5G core network. When searching for satellites, a gNB can utilize the publicly available data of the trusted satellite registered in the 5G (Continued)

core network to speed up satellite searching, improve satellite link services, and filter out untrusted satellites.

10 Claims, 4 Drawing Sheets

(51) Int. Cl.
  *H04W 76/11*          (2018.01)
  *H04W 76/25*          (2018.01)

(56)                    References Cited

FOREIGN PATENT DOCUMENTS

| | | | |
|---|---|---|---|
| CN | 113098589 | A | 7/2021 |
| CN | 113115394 | A | 7/2021 |
| CN | 113328779 | A | 8/2021 |
| CN | 113328781 | A | 8/2021 |
| CN | 113810097 | A | 12/2021 |
| CN | 114025423 | A | 2/2022 |

OTHER PUBLICATIONS

ISA State Intellectual Property Office of the People's Republic of China, Written Opinion of the International Searching Authority Issued in Application No. PCT/CN2023/079482, Jun. 27, 2023, WIPO, 6 pages. (Submitted with Machine Translation).
State Intellectual Property Office of the People's Republic of China, Office Action and Search Report Issued in Application No. 202211418844.9, May 13, 2023, 7 pages. (Submitted with Machine/ Partial Translation).

* cited by examiner

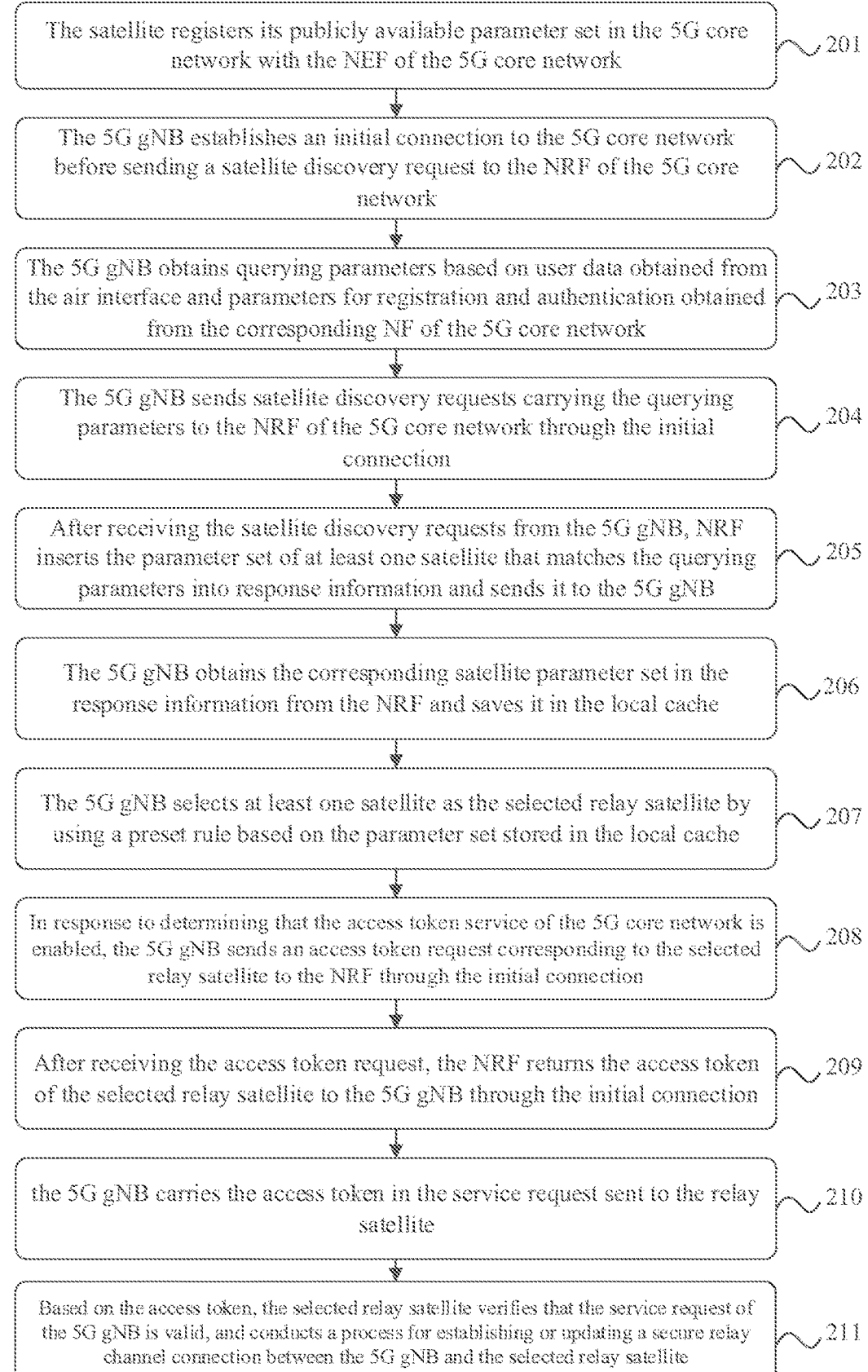

The satellite registers its publicly available parameter set in the 5G core network with the NEF of the 5G core network ⟋201

The 5G gNB establishes an initial connection to the 5G core network before sending a satellite discovery request to the NRF of the 5G core network ⟋202

The 5G gNB obtains querying parameters based on user data obtained from the air interface and parameters for registration and authentication obtained from the corresponding NF of the 5G core network ⟋203

The 5G gNB sends satellite discovery requests carrying the querying parameters to the NRF of the 5G core network through the initial connection ⟋204

After receiving the satellite discovery requests from the 5G gNB, NRF inserts the parameter set of at least one satellite that matches the querying parameters into response information and sends it to the 5G gNB ⟋205

The 5G gNB obtains the corresponding satellite parameter set in the response information from the NRF and saves it in the local cache ⟋206

The 5G gNB selects at least one satellite as the selected relay satellite by using a preset rule based on the parameter set stored in the local cache ⟋207

In response to determining that the access token service of the 5G core network is enabled, the 5G gNB sends an access token request corresponding to the selected relay satellite to the NRF through the initial connection ⟋208

After receiving the access token request, the NRF returns the access token of the selected relay satellite to the 5G gNB through the initial connection ⟋209 the 5G gNB carries the access token in the service request sent to the relay satellite ⟋210

Based on the access token, the selected relay satellite verifies that the service request of the 5G gNB is valid, and conducts a process for establishing or updating a secure relay channel connection between the 5G gNB and the selected relay satellite ⟋211

FIG. 2

METHOD FOR SIGNALING INTERACTION IN 5G SPACE-GROUND INTEGRATED HETEROGENEOUS NETWORK ARCHITECTURE

CROSS REFERENCE TO RELATED APPLICATIONS

The present application is a U.S. National Phase of International Application No. PCT/CN2023/079482 entitled "METHOD FOR SIGNALING INTERACTION IN 5G SPACE-GROUND INTEGRATED HETEROGENEOUS NETWORK ARCHITECTURE," and filed on Mar. 3, 2023. International Application No. PCT/CN2023/079482 claims priority to Chinese Patent Application No. 202211418844.9 filed on Nov. 14, 2022. The entire contents of each of the above-listed applications are hereby incorporated by reference for all purposes.

TECHNICAL FIELD

The present invention relates to computer network and communication technology, and in particular, to a method of signaling interaction in 5G space-ground integrated heterogeneous network architecture.

BACKGROUND

The current 3GPP fifth generation mobile communication system (5G) integrates non-terrestrial networks (NTN) into a globally standardized wireless system to provide continuous services to areas where terrestrial networks cannot be used, and to expand the scope of services with the characteristic of large coverage area of satellites.

A user connects to a 5G ground node base-station (gNB) through an air interface, and the backhaul network of the 5G gNB is relayed by satellites and connected to the remote 5G core network. The user ultimately connects to the Data Network (DN) through the 5G data pipeline relayed by the satellites. It should be noted that the 5G system and the satellite system used as a relay node in the 5G backhaul network are controlled by their respective core networks. Currently there is no architecture or method for signaling interaction between the two systems. In general, the way via which a 5G gNB searches for a relay satellite depends on the pre-configuration profile, and the configuration information in the pre-configuration profile belongs to node information, which can only be manually modified through the 5G network management system.

Therefore, the existing satellite systems, when space-ground integrated networking with 5G systems, have the following problems: (1) when networking with 5G systems, the publicly available data cannot be shared in heterogeneous network architecture, existing functions cannot be reused across systems, and there is no data sharing architecture or system process; (2) the 5G gNB searches for satellite by using satellite pre-configuration manner, such that any modification in satellite information requires to modify the gNB pre-configuration profile, while there is no method to integrate the Network Function (NF) management system based on the 5G enhanced Service-based Architecture (eSBA); (3) when the 5G gNB searches for a satellite by regarding satellites as NF nodes, the Network Repository Function (NRF) cannot be reused, so that the existing security system for 5G cannot be used for authenticating the satellites excluded from the configuration table as well as corresponding satellite connections.

SUMMARY

In view of the existing problems of related technologies, the present invention provides a method of signaling interaction in 5G space-ground integrated heterogeneous network architecture, which is used to solve the problem that information and functions cannot be shared between the satellite system networked with 5G and 5G System (5GS)

To achieve the above goal, the present disclosure provides a method of signaling interaction in 5G space-ground integrated heterogeneous network architecture, which may include the following steps:

S1: one or more satellites or satellite instances register respective publicly available parameter sets of them which can be used for satellite discovery with a Network Exposure Function (NEF) of a 5G core network to a NRF of the 5G core network;

S2: when a 5G gNB is about to establish or update a connection with satellites, the 5G gNB obtains a parameter set from the NRF with one or more querying parameters, and selects the at least one satellite or satellite instance as at least one relay satellite by using a preset rule according to the parameter set obtained from the NRF, wherein, the parameter set is a subset or a full set of the respective publicly available parameters set and comprises the publicly available parameter set registered to the NRF by at least one satellite or at least one satellite instance among the one or more satellites or satellite instances;

S3: in response to determining that access token service of the 5G core network is not enabled, the 5G gNB directly sends a service request to the selected relay satellite to initiate a process for establishing or updating a connection; or in response to determining that access token service of the 5G core network is enabled, the 5G gNB obtains an access token for the selected relay satellite from the NRF, and sends a service request carrying the access token to the selected relay satellite so to proceed to step S4;

S4: the selected relay satellite receives the service request carrying the access token sent by the 5G gNB, and verifies validity of the service request from the 5G gNB by using the access token;

wherein, the satellite instance refers to a virtualized identifier associated with functions of a satellite in the case that the satellite supports network functions virtualization.

In some embodiments, step S1 may include the following steps:

S1.1: the satellite or the satellite instance, by regarding itself as a NF of the 5G core network, provides the publicly available parameter set of itself that can be used for the satellite discovery to the NEF of the 5G core network; and S1.2: the NEF of the 5G core network, by using parameter provision service, registers the publicly available parameter set provided by the satellite or the satellite instance to the NRF of the 5G core network via NF Register service process in the NF management service of the NRF; in response to determining that access token service of the 5G core network is enabled, the NRF generates the access token corresponding to the identifier of the satellite or the satellite instance.

In some embodiments, the publicly available parameter set, after being registered in the NRF of the 5G core network, is used for the discovery service of the NRF. The publicly available parameter set includes service types provided by the satellite, identification of the satellite, network identifier information of the satellite in a converged network, network slice information supported by the satellite, the virtualized identifier associated with functions of the satellite when the satellite supports network functions virtualization, and service information of the satellite.

In some embodiments, the service information of the satellite includes: an access angle, time information, a geographic location, a gNB access manner supported by the satellite, a load status of the satellite, connection information between backhaul network and core network that can be provided by the satellite, and a name of a data network to which the satellite can be relayed.

In some embodiments, step S2 may include the following steps:

S2.1: the 5G gNB determines the querying parameters based on characteristics of base stations and/or users, and loads the querying parameters into a satellite discovery request;

S2.2: when the 5G gNB initiates a process for establishing or updating a satellite relay channel, the 5G gNB sends the satellite discovery request to the NRF of the 5G core network, so to request the parameter set from the NRF based on the querying parameters carried in the satellite discovery request;

S2.3: by using the discovery service of the NRF based on the respective publicly available parameter sets registered by one or more satellites and the received querying parameters, the NRF returns the parameter set that matches the querying parameters to the 5G gNB; and S2.4: after receiving the parameter set, by using the preset rule based on the parameter set, the 5G gNB selects the at least one satellite or at least one satellite instance as the at least one relay satellite.

In some embodiments, the parameter set that matches the querying parameters includes service information of the at least one satellite or at least one satellite instance.

In some embodiments, the preset rule includes the round-robin algorithm, random selection rule, and NF selection rule for the 5G system.

In some embodiments, in response to determining that access token service of the 5G core network is enabled, step S3 may include the following steps:

S3.1: the 5G gNB sends an access token request corresponding to the selected relay satellite to the NRF based on the access token service, wherein the access token request is used to obtain the access token of the selected relay satellite from the NRF of the 5G core network;

S3.2: according to the access token request, the NRF returns the access token of the selected relay satellite to the 5G gNB; and S3.3: in response to that the 5G gNB has obtained the access token of the selected relay satellite, the service request initiated by the 5G gNB to the selected relay satellite carries the access token; in response to not that the 5G gNB hasn't obtained the access token of the selected relay satellite, the service request initiated by the 5G gNB to the selected relay satellite does not carry the access token.

In some embodiments, in step S4, verifying validity of the service request from the 5G gNB may include:

S4.1: the selected relay satellite receives the service request from the 5G gNB, and verifies the validity of the service request by determining whether the service request carries the access token authorized by the selected relay satellite;

S4.2: if the selected relay satellite verifies that the service request of the 5G gNB is valid, the service request of the 5G gNB is allowed to pass, and the connection can be established or updated successfully; and S4.3: if the selected relay satellite verifies that the service request of the 5G gNB is invalid, the service request of the 5G gNB is rejected, and the connection fails to be established or updated.

In some embodiments, if the connection fails to establish or update as in step S4.3, the 5G gNB may initiate a new satellite search process to discover a new relay satellite.

The present disclosure provides an architecture for sharing information between heterogeneous systems networking with a 5G system and a method for reusing existing 5G functions, which enables a newly added node (such as satellites) to be integrated into the 5G eSBA as a 5G NF and reuse existing 5G functions and processes, which can effectively reduce the overall costs for hardware, operation, and maintenance of network equipment.

Compared with the current technologies for networking satellites and 5G systems, the embodiments provided in the present disclosure can effectively reduce the operational complexity of maintaining and updating satellite search profiles in 5G space-ground integrated systems. In particular, by using satellites as NF nodes, shareable data of heterogeneous systems can be associated with some satellite NF management services and thus can be integrated into the existing 5G systems, which shortens the satellite search time of 5G gNBs, improves the connection pipeline security between base stations and satellites, and further enhances the overall stability and reliability of heterogeneous system services.

BRIEF DESCRIPTION OF DRAWINGS

FIG. 2 is a flow chart showing specific steps of an embodiment of the present disclosure;

DETAILED DESCRIPTION OF EMBODIMENTS

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. On the contrary, they are merely examples of an apparatus and a method consistent with some aspects of the present application as recited in detail in the appended claims.

The terms used in this application are merely for the purpose of describing specific embodiments, and are not intended to limit this application. Terms determined by "a", "the" and "said" in their singular forms in the present application and the appended claims are also intended to include plurality, unless clearly indicated otherwise in the context. It should also be understood that the term "and/or" as used herein is and includes any and all possible combinations of one or more of the associated listed items.

Figure 1:
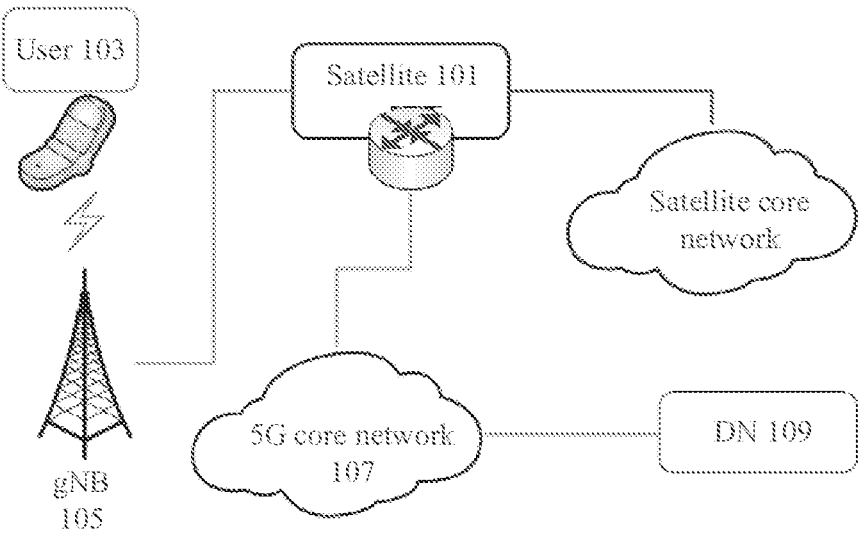
FIG. 1 illustrates an architecture diagram of the space-ground integrated network system.

As shown in FIG. 1, an architecture diagram of the space-ground integrated network system, a satellite relay node is composed of multiple satellites 101. User 103 connects to a 5G gNB 105 through an air interface. The backhaul network of the 5G gNB 105 is relayed by satellite 101 and connected to the remote 5G core network 107. User 103 is ultimately connected to the Data Network (DN) 109 through the 5G data pipeline relayed by satellite 101.

Wherein, the user 103 can connect to a 5G gNB through a user equipment (UE), the UE can be a communication device with wireless connection function, a portable device, a vehicle device, etc. It includes but is not limited to: Mobile Phone, Palmtop Computer, Personal Digital Assistant, Notebook, Tablet PC, wearable devices, auto PC or other on-board devices.

Based on the above architecture, the present invention provides a method of signaling interaction in 5G space-ground integrated heterogeneous network architecture, which includes the following steps:

S1: one or more satellites or satellite instances register a publicly available parameter set which can be used for satellite discovery with NEF of 5G core network to NRF of 5G core network;

S2: when a 5G gNB initiates a process for establishing or updating connection with a satellite, the gNB obtains a parameter set from the NRF with one or more querying parameters, and selects at least one satellite or at least one satellite instance as at least one relay satellite by using a preset rule according to the parameter set obtained from the NRF, wherein, the parameter set is a subset or a full set of the publicly available parameter set;

S3: in response to determining that access token service of the 5G core network is not enabled, the 5G gNB directly sends a service request to the selected relay satellite to initiate a process for establishing or updating a connection;

in response to determining that access token service of the 5G core network is enabled, the 5G gNB obtains an access token for the selected relay satellite from the NRF and sends a service request carrying the access token to the selected relay satellite, so to proceed to Step S4;

S4: the selected relay satellite receives a service request carrying the access token sent by the 5G gNB, and verifies the validity of the service request of the 5G gNB through the access token; if the verification is passed, the selected relay satellite will allow the service request of the current 5G gNB to pass and perform the process of connection establishment or connection update; If the verification is not passed, the selected relay satellite will reject the service request of the current 5G gNB, resulting in failure of connection establishment or connection update.

Wherein, in step S2, the querying parameters can be determined by the 5G gNB based on characteristics of base stations and/or users. The preset rule can include specific algorithms (such as round-robin algorithm), random selection rules, and NF selection rules for 5G systems. In practical applications, this preset rule can be set according to specific applications, and there are no restrictions in the present application.

In some embodiments, the satellites in the above steps may include: satellites and/or satellite instances, wherein, the satellite instance refers to a virtualized identifier associated with functions of a satellite in the case that the satellite supports network functions virtualization.

In some embodiments, in step S3, in response to determining that access token service of the 5G core network is enabled, the 5G gNB may fails to obtain an access token for the selected relay satellite from the NRF, at that time, the service request sent by the 5G gNB may not carry the access token to the selected relay satellite. Because the service request does not carry the access token, in step S4, the selected relay satellite will not pass the verification of the service request from the 5G gNB, and reject the service request from the 5G gNB, so the connection will fail to be established or updated. The 5G gNB will initiate a new satellite search process to select other satellites or satellite instances as relay satellites.

Optionally, when the 5G gNB fails to obtain the access token of the currently selected relay satellite in step S3, the gNB can obtain the access token of the currently selected relay satellite from the NRF again, or select another satellite or satellite instance as a relay satellite by initiating a new search process. In some embodiments, N represents the number of times the 5G gNB obtains the access token of the currently selected relay satellite from the NRF and can be preset. After the 5G gNB tries to obtain the access token of the currently selected relay satellite N times and still fails, by initiating a new search process it can select another satellite or satellite instance as a relay satellite The Step S1 includes the following steps:

S1.1: the satellite or the satellite instance regards itself as a NF of the 5G core network, provides the publicly available parameter set that can be used for the satellite discovery to the NEF of the 5G core network; and S1.2: The NEF of the 5G core network, based on the parameter provision service, registers the publicly available parameter set provided by satellites or satellite instances, with the NF Register service process in the NF management service of the NRF, to the NRF of the 5G core network; in response to determining that access token service of the 5G core network is enabled, the NRF generates the access token corresponding to the identifier of the satellite or the satellite instance.

The publicly available parameter set, after being registered in the NRF of the 5G core network, can be used for the discovery service of the NRF. The publicly available parameter set may include service types provided by the satellite, the identification of the satellite, network identifier information of the satellite in a converged network, network slice information supported by the satellite, the virtualized identifier associated with functions when the satellite supports network functions virtualization, and service information of the satellite, etc.

The service information of the satellite refers to the information that is required for the satellite search process and indicating the services provided by satellites or satellite instances, which may include an access angle, time information, a geographic location, a gNB access manner supported by the satellite, a load status of the satellite, connection information between backhaul network and core network that can be provided by the satellite, and a data network name (DNN) to which the satellite can be relayed.

The Step S2 includes the following steps:

S2.1: the 5G gNB determines the querying parameters based on characteristics of base stations and/or users, and adds the querying parameters to a satellite discovery request;

S2.2: when the 5G gNB initiates a process for establishing or updating a satellite relay channel, it sends the satellite discovery request to the NRF of the 5G core network, so to request the parameter set from the NRF based on the querying parameters carried in the satellite discovery request. The parameter set is registered by at least one satellite or at least one satellite instance among the one or more satellites or satellite instances, and it is a subset or a full set of the publicly available parameter set;

S2.3: by using the discovery service of the NRF based on the publicly available parameter set registered by satellites and the received querying parameters, the NRF returns a parameter set matching the querying parameters for at least one satellite or at least one satellite instance to the 5G gNB. The parameter set matching the querying parameters for at least one satellite or at least one satellite instance includes the service information for the at least one satellite or at least one satellite instance.

S2.4 after receiving the parameter set, by using the preset rule based on the received parameter set, the 5G gNB selects the at least one satellite or at least one satellite instance as the at least one relay satellite.

The Step S3 includes the following steps:

S3.1: in response to determining that access token service of the 5G core network is not enabled, the 5G gNB directly sends a service request to the selected relay satellite to initiate a process for establishing or updating a connection; in response to determining that access token service of the 5G core network is enabled, proceeds to step S3.2 and the subsequent steps;

S3.2: the 5G gNB sends an access token request corresponding to the selected relay satellite to the NRF based on the access token service, wherein the access token request is used to obtain the access token of the selected relay satellite from the NRF of the 5G core network;

S3.3: according to the access token request, the NRF returns the access token of the selected relay satellite to the 5G gNB;

S3.4: in response to that the 5G gNB has obtained the access token of the selected relay satellite, the service request initiated by the 5G gNB to the selected relay satellite carries the access token; in response to that the 5G gNB has not obtained the access token of the selected relay satellite, the service request initiated by the 5G gNB to the selected relay satellite does not carry the access token.

In some embodiments, the access token request in step S3.2 may include: the "scope" parameter indicating the names of the Satellite Services that the 5G gNB is trying to access, the NF type of the expected NF Service Producer of the selected relay satellite serving as the NF service provider, the NF instance ID of the expected NF Service Producer of the selected relay satellite serving as the NF service provider, and other information. Optionally, in response to determining the access token request is used for roaming scenarios, the access token request may also include Home and Serving PLMN IDs; in response to determining that the selected relay satellites corresponding to the access token request are a satellite group composed of multiple satellites, the access token request may also include the NF Set ID of the expected NF service producer instances corresponding to the satellite group.

Optionally, the access token request may also include other information, including but not limited to: when the 5G gNB is an NF service user, the Global RAN Node ID of the 5G gNB and the RAN Node type of the 5G gNB, etc. In addition, additional information can be added to the access token request based on actual application situations, and the present application does not limit this.

In some embodiments, in step S3.4, in response to that the 5G gNB has not obtained the access token of the selected relay satellite, before initiating a service request to the selected relay satellite, the 5G gNB can obtain the access token of the currently selected relay satellite again or select a new relay satellite.

The Step S4 includes the following steps:

S4.1: the selected relay satellite receives the service request from the 5G gNB, and verifies the validity of the service request by determining whether the service request carries the access token authorized by the selected relay satellite;

S4.2: if the selected relay satellite verifies that the service request of the 5G gNB is valid, the service request of the 5G gNB is allowed to pass, and the connection is established or updated successfully; and S4.3: if the selected relay satellite verifies that the service request of the 5G gNB is invalid, the service request of the 5G gNB is rejected, and the connection fails to be established or updated. The 5G gNB may initiate a new satellite search process to discover a new relay satellite.

The method of signaling interaction in 5G space-ground integrated heterogeneous network architecture provided by the present invention, based on the functional framework of 5G core network, allows the publicly available data used for trusted satellite discovery to be registered in the 5G core network through the interaction architecture and method proposed in the present invention. When the gNB searches and selects satellites, the publicly available data registered by trusted satellites in the 5G core network is used to accelerate the search speed, improve satellite link services, and filter out trusted satellites. It reduces the complexity of maintaining and updating satellite profiles during the networking process between satellites and 5G systems. While reusing the existing network functions of 5G system to further reduce the cost of network deployment and ensure efficiency, it ensures the service quality in the Heterogeneous System Architecture (HSA) consists of satellites and 5G systems.

Embodiment 1

As shown in FIG. 2, the present invention provides a method of signaling interaction in 5G space-ground integrated heterogeneous network architecture, and the specific implementation steps are as follows:

Step 201: The satellite regards itself as a NF of the 5G core network in an integrated heterogeneous system, and registers its publicly available parameter set in the 5G core network with the NEF of the 5G core network.

This step is divided into the following substeps:

Step 2011: Using parameter provision service of the NEF node in the 5G core network, the satellite registers their publicly available parameter set to the NF of the 5G core network. The publicly available parameter set is the publicly available data of the satellite, including service types provided by the satellite, the identification of the satellite, network identifier information of the satellite in a converged network, network slice information supported by the satellite, the virtualized identifier associated with functions when the satellite supports the network functions virtualization, and service information of the satellite, etc.

Step 2012: NEF registers the publicly available parameter set of the satellite to the NRF, through the NF Register service in the NF Management service provided by the NRF, which is used for the discovery service of the NRF, and the access tokens corresponding to the satellite is generated on the NRF.

Wherein, after the publicly available parameter set of the satellite that can be used for the discovery service of the NRF is successfully registered, the satellite can be found on the NRF through the corresponding parameters. The access token corresponding to the satellite can be obtained through the NRF access token service, and the access token can be generated in response to the enablement of the access token service. Optionally, the access token can also be generated directly in the NRF.

Step 202: Before the 5G gNB sends a satellite discovery request to the NRF of the 5G core network, it can search for the satellite and establish an initial connection to the 5G core network in a preset way (for example, with a pre-configuration table). The initial connection is the default connection or temporary connection, instead of the secure relay channel connection established or updated based on the way of NRF query. Via this step, the initial connection between the 5G gNB and the NRF of the 5G core network is established, which enables the 5G gNB to conduct a process for establishing a secure relay channel connection such as satellite search, obtaining access tokens through the NRF of the 5G core network, etc.

Step 203: The 5G gNB using certain algorithms (such as round-robin algorithm) filters or process the user data obtained from the air interface side, and the parameters for registration and authentication obtained from the corresponding NF of the 5G core network, to obtain the querying parameters that serve as the matching basis for the target satellite in the discovery service of the NRF, and inserts the querying parameters into the satellite discovery request.

Step 204: The 5G gNB sends satellite discovery requests carrying the querying parameters to the NRF of the 5G core network through the initial connection.

Step 205: After receiving a satellite discovery request from a 5G gNB, the NRF searches for target satellites by using the discovery service of the NRF based on the publicly available parameter set registered by one or more satellites and the querying parameters, so to obtain the parameter set of at least one satellite that matches the querying parameters. The obtained parameter set of at least one satellite that matches the querying parameters is inserted into response information, and the response information is sent to the 5G gNB through the initial connection. Wherein, the parameter set is a subset or full set of the publicly available parameter set.

Step 206: The 5G gNB obtains the corresponding satellite parameter set in the response information from the NRF and saves it in the local cache for future use. This cache should have timeliness, such as using timers such as expiration time to ensure timeliness.

Step 207: The 5G gNB selects at least one satellite as the relay satellite by using a preset rule (such as a certain preset algorithm, random selection rules, etc.) based on the parameter set stored in the local cache.

Step 208: In response to determining that access token service of the 5G core network is enabled, the 5G gNB sends an access token request corresponding to the selected relay satellite to the NRF through the initial connection. The access token request is used to request the access token of the selected relay satellite from the NRF of the 5G core network.

Step 209: After receiving the access token request, the NRF obtains the access token corresponding to the selected relay satellite via the access token service and returns the access token to the 5G gNB through the initial connection.

Step 210: After obtaining the access token of the selected relay satellite, the 5G gNB carries the access token in the service request sent to the relay satellite. The service request is used to conduct a process for establishing or updating a secure relay channel connection between the 5G gNB and the relay satellite.

Step 211: After receiving the service request from the 5G gNB, the relay satellite verifies the validity of the service request of the 5G gNB based on the access token. If the selected relay satellite verifies that the service request of the 5G gNB is valid, the service request from the current 5G gNB is allowed to pass, and a process for establishing or updating a secure relay channel connection between the 5G gNB and the relay satellite is conducted. At this time, the initial connection can be released.

In the embodiments of the present application, the execution order between the above steps is not strictly limited. For example, step 203 can be executed before establishing the initial connection in step 202 to obtain querying parameters. The execution sequence of the above steps can be adjusted according to the actual situation.

Optionally, the satellites in this embodiment include satellites and/or satellite instances.

In some embodiments, step 208 may also include: in response to determining that access token service of the 5G core network is not enabled, the 5G gNB directly sends a service request to the currently selected relay satellite through the initial connection, to conduct a process for establishing or updating a secure relay channel connection between the 5G gNB and the relay satellite. At this time, steps 209 to 211 may no longer be executed.

In some embodiments, in step 208, after the 5G gNB sends an access token request corresponding to the selected relay satellite to the NRF through the initial connection, it may not be possible to obtain an access token corresponding to the selected relay satellite from the NRF. At this time, in step 210, the service request sent by the 5G gNB to the relay satellite does not carry the access token of the relay satellite; Step 211 further includes: if the relay satellite verifies that the service request of the 5G gNB is invalid, the relay satellite rejects the service request of the current 5G gNB, and the secure relay channel connection fails to be established or updated; the 5G gNB can initiate a new satellite search processes to obtain new relay satellites.

Optionally, if the 5G gNB fails to obtain the access token corresponding to the selected relay satellite from the NRF, the 5G gNB can further initiate N times of the process towards the NRF to obtain the access token of the selected relay satellite or select a new relay satellite, wherein N represents the preset number of times.

Figure 3:
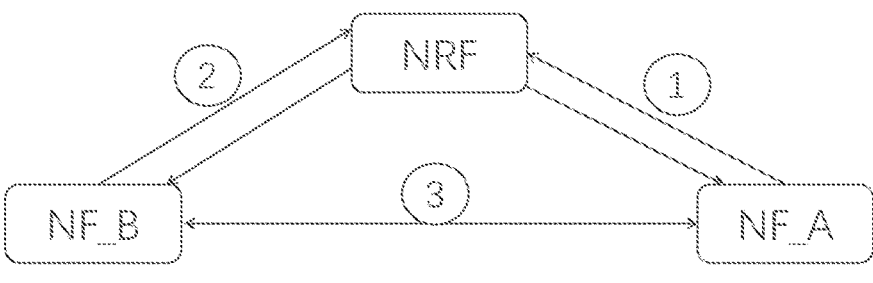
FIG. 3 is a flow chart for discovering NF of a 5G core network.

FIG. 3 is a flow chart for discovering NFs of the 5G core network, the specific implementation steps are as follows;

(1) NF_A registers its NF instance profile and associated parameters in NRF, and NRF returns success to confirm NF_A successfully registers. NRF itself has the function of preventing registration information modification. Once a NF instance successfully registers, NRF cannot modify the registration information of the NF instance to protect its information security.

(2) When NF_B needs communication or functional interaction with NF_A, NF_B first sends the querying parameters of the NF instance to be searched to NRF. Based on the querying parameters of the NF instance to be searched, which is sent by NF_B, and the registration information that the NF instance registered in NRF. NRF returns the corresponding NF instance profile, and the profile contains the registration information of one or more NF instances.

(3) According to the profile returned by NRF, NF_B uses algorithms to select the NF instance and connect the NF instance (such as NF_A) for communication.

Figure 4:
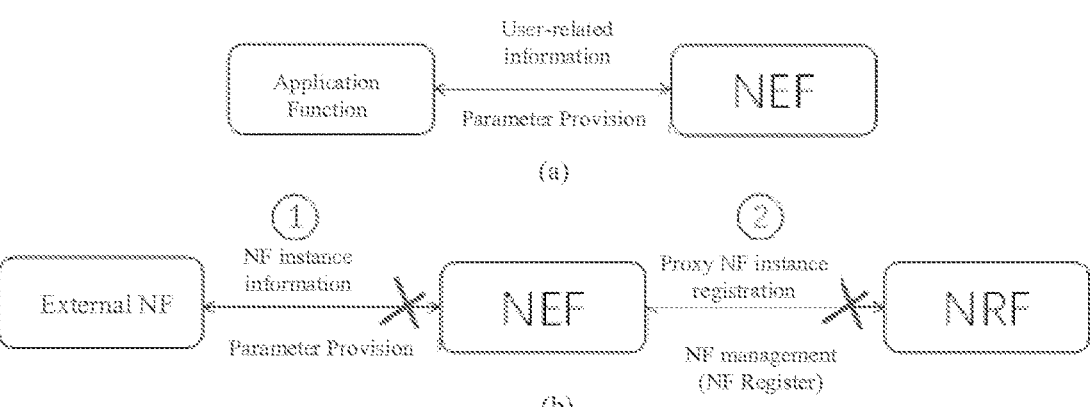
FIG. 4 illustrates an overview diagram of a NEF in a 5G core network.

FIG. 4 shows an overview diagram of NEF. As shown in FIG. 4 (*a*), the 5G core network only supports external one or more application functions to provide service parameters for some User Equipment (UE) with parameter provision service of NEF nodes. As shown in FIG. 4 (*b*), the registration service interface (may also be named as NF Register) of the NF management service between NEF and NRF does not have a Proxy registration interface, and external NF cannot register themselves in NRF with NEF.

Figure 5:
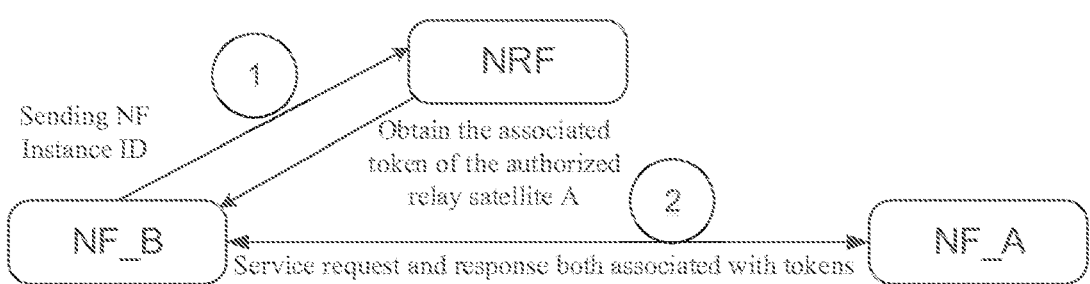
FIG. 5 illustrates a flow chart of access token service in a 5G core network.

NRF can also provide access token service for NF instances. With access token service, service users (such as NF_B) can establish or update connections with service providers (such as NF_A) only when NRF provides authorized access tokens, as shown in FIG. 5. The specific implementation steps are as follows:

After obtaining the registration information of the NF instance for the service provider corresponding to the querying parameters from NRF, based on the registration information, NF_B selects one service provider (such as NF_A) NF instance and obtains the access token authorized by the service provider (NF_A) NF instance with the access token service request of the NRF.

After obtaining the access token of the corresponding service provider (NF_A) NF instance from NRF, NF_B sends service request information to the service provider, which must carry the access token of the corresponding peer service provider. The service response information sent by the service provider is also associated with its own access token. If the access token service is enabled, but the service user (NF_B) does not obtain the access token for the corresponding service provider NF instance from the access token service of the NRF, the connection is verified as invalid and the connection fails at this time.

Figure 6:
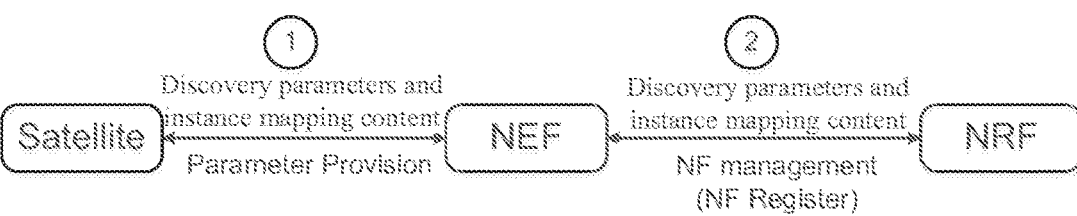
FIG. 6 illustrates a flow chart for a satellite registering a publicly available parameter set to a 5G core network according to Embodiment 1 of the present disclosure.

In step 201, the process of registering the publicly available parameter set that can be used for the NRF of the 5G core network related services is shown in FIG. 6. The specific implementation steps are as follows:

(1) The satellite regards itself as a NF of the 5G core network and provides its own publicly available parameter set to the NEF of the 5G core network. With parameter provision service of NEF, it provides the service information required by the satellite search process for the NRF of the 5G core network. The publicly available parameter set provided by the satellite should include the discovery parameters and mapping content of the satellites or satellite instances.

(2) The NEF of the 5G core network registers the satellite discovery parameters and satellite mapping content provided by satellites with the NF Register service process of the NF Management service of the NRF in the NRF of the 5G core network.

Figures 7, 8:
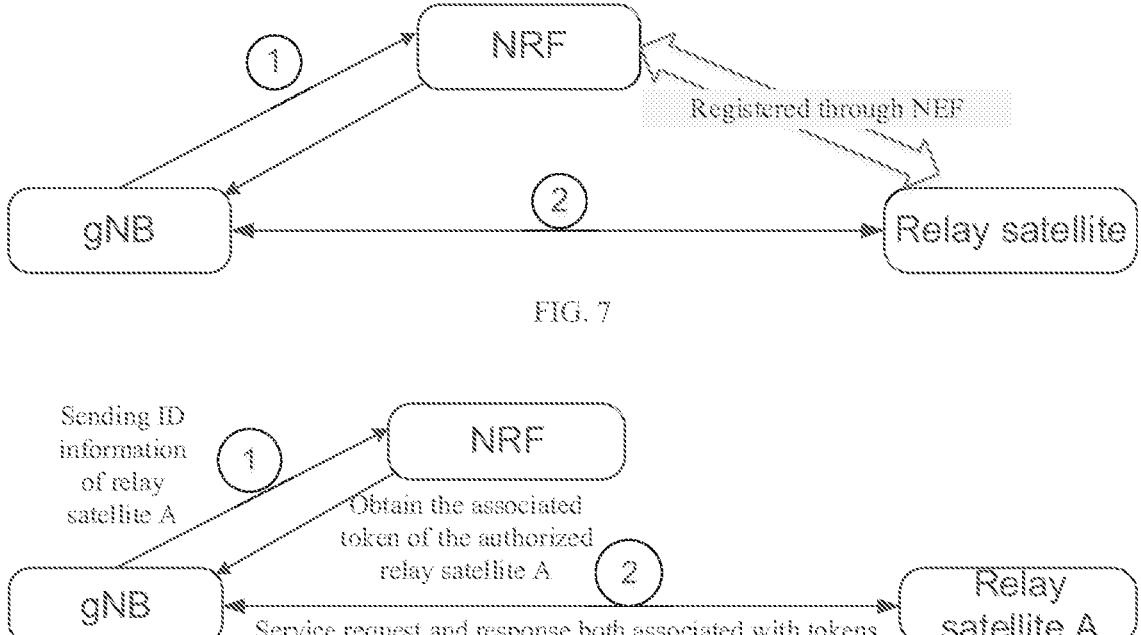
FIG. 7 illustrates a flow chart of a satellite search process according to Embodiment 1 of the present disclosure.
FIG. 8 illustrates a flow chart of access token service process according to Embodiment 1 of the present disclosure.

The satellite search process in steps 204 to 207 is shown in FIG. 7, and the specific implementation steps are as follows:

(1) When the 5G gNB initiates a process for establishing or updating a satellite relay channel, it sends the satellite discovery request to the NRF of the 5G core network to perform the satellite discovery process. The NRF, based on the publicly available parameter set of the registered relay satellites for discovery service of the NRF and the querying parameters carried in the satellite discovery request, returns a parameter set at least one satellite or at least one satellite instance that matches the querying parameters. The parameter set may is a subset or full set of the publicly available parameter set, and may include the service information for the at least one satellite or at least one satellite instance.

(2) The 5G gNB selects at least one relay satellite by using a preset algorithm (such as round-robin) based on the received parameter set of at least one satellite or at least one satellite instance.

The access token service process in step 208 is shown in FIG. 8, and the specific implementation steps are as follows:

(1) If access token service of the 5G core network is enabled, after selecting at least one relay satellite A, the 5G gNB sends an access token request corresponding to the relay satellite A to the NRF to obtain the access token authorized by relay satellite A.

(2) After obtaining the access token of relay satellite A from NRF, the 5G gNB sends a service request message to relay satellite A, which must carry the corresponding access token. If the access token function is enabled but the 5G gNB has not obtained the access token of relay satellite A from the NRF, then relay satellite A verifies that the service request of the gNB is invalid, and the establishment or update of the connection fails. The 5G gNB will reinitiate the relay satellite search process, select a new relay satellite or relay satellite instance, new based on the newly obtained parameter set of the satellite or satellite instance from NRF, and obtain the corresponding access token.

The above descriptions are merely detailed description of the present disclosure to which the scope of protection of the present disclosure is not limited. Within the technical scope of the present disclosure, any changes or substitutions that readily occur to one skilled in the art should fall in the scope of protection of the present disclosure.

The invention claimed is:

1. A method of signaling interaction in 5G space-ground integrated heterogeneous network architecture, comprises the following steps:

S1: one or more satellites or satellite instances outside 5G core network, by regarding the one or more satellites or satellite instances as a Network Function (NF) of the 5G core network, provide respective publicly available parameter sets for satellite discovery of them to a Network Exposure Function (NEF) of the 5G core network; the NEF of the 5G core network, by using parameter provision service and via a NF Register service process for NF management service of a Network Repository Function (NRF) of the 5G core network, registers the publicly available parameter sets provided by the one or more satellites or the satellite instances to the NRF of the 5G core network;

S2: when a 5G ground node base-station (gNB) is about to establish or update a connection with satellites, the 5G gNB obtains a parameter set from the NRF with one or more querying parameters, and selects at least one satellite or at least one satellite instance as at least one relay satellite by using a preset rule according to the parameter set obtained from the NRF, wherein, the parameter set is a subset or a full set of the respective publicly available parameter sets and comprises the publicly available parameter set registered to the NRF by the at least one satellite or at least one satellite instance among the one or more satellites or satellite instances;

S3: in response to determining that access token service of the 5G core network is not enabled, the 5G gNB directly sends a service request to the selected relay satellite to initiate a process for establishing or updating a connection; or in response to determining that access token service of the 5G core network is enabled, the 5G gNB obtains an access token of the selected relay satellite from the NRF and sends a service request carrying the access token to the selected relay satellite, so to proceed to step S4;

S4: the selected relay satellite receives the service request carrying the access token sent by the 5G gNB, and verifies validity of the service request from the 5G gNB with the access token;

wherein, the satellite instance refers to a virtualized identifier associated with functions of a satellite in the case that the satellite supports network functions virtualization.

2. The method according to claim 1, wherein, the step S1 comprises the following steps:

in response to determining that access token service of the 5G core network is enabled, the NRF generates the access token corresponding to an identifier of the satellite or the satellite instance.

3. The method according to claim 2, wherein, after being registered in the NRF of the 5G core network, the publicly available parameter set is used for discovery service of the NRF;

the publicly available parameter set comprises a service type provided by the satellite, an identification of the satellite, network identifier information of the satellite in a converged network, network slice information supported by the satellite, a virtualized identifier associated with functions of the satellite when the satellite supports network functions virtualization, and service information of the satellite.

4. The method according to claim 3, wherein, the service information of the satellite comprises an access angle, time information, a geographic location, a gNB access manner supported by the satellite, a load status of the satellite, connection information between backhaul network and core network that can be provided by the satellite, and a name of a data network to which the satellite can be relayed.

5. The method according to claim 1, wherein, the step S2 comprises the following steps:

S2.1: the 5G gNB determines the querying parameters based on characteristics of base stations and/or users, and loads the querying parameters to a satellite discovery request;

S2.2: when the 5G gNB initiates a process for establishing or updating a satellite relay channel, the 5G gNB sends the satellite discovery request to the NRF of the 5G core network, so to request the parameter set from the NRF based on the querying parameters carried in the satellite discovery request;

S2.3: by using discovery service of the NRF based on the publicly available parameter set registered by the one or more satellites and the received querying parameters, the NRF returns the parameter set that matches the querying parameters to the 5G gNB; and S2.4: after receiving the parameter set, by using the preset rule based on the parameter set, the 5G gNB selects the at least one satellite or at least one satellite instance as the at least one relay satellite.

6. The method according to claim 5, wherein, the parameter set that matches the querying parameters comprises service information for the at least one satellite or at least one satellite instance.

7. The method according to claim 5, wherein, the preset rule comprises a round-robin algorithm, a random selection rule, or a NF selection rule for a 5G system.

8. The method according to claim 1, wherein, in response to determining that access token service of the 5G core network is enabled, the step S3 comprises the following steps:

S3.1: the 5G gNB sends an access token request corresponding to the selected relay satellite to the NRF based on the access token service, wherein the access token request is used to obtain the access token of the selected relay satellite from the NRF of the 5G core network;

S3.2: according to the access token request, the NRF returns the access token of the selected relay satellite to the 5G gNB; and S3.3: in response to that the 5G gNB has obtained the access token of the selected relay satellite, the service request initiated by the 5G gNB to the selected relay satellite carries the access token; in response to that the 5G gNB hasn't obtained the access token of the selected relay satellite, the service request initiated by the 5G gNB to the selected relay satellite doesn't carry the access token.

9. The method according to claim 1, wherein, verifying validity of the service request from the 5G gNB comprises:

S4.1: the selected relay satellite receives the service request from the 5G gNB, and verifies the validity of the service request by determining whether the service request carries the access token authorized by the selected relay satellite;

S4.2: if the selected relay satellite verifies that the service request of the 5G gNB is valid, the service request of the 5G gNB is allowed to pass, and the connection is established or updated successfully; and S4.3: if the selected relay satellite verifies that the service request of the 5G gNB is invalid, the service request of the 5G gNB is rejected, and the connection fails to be established or updated.

10. The method according to claim 9, wherein, if the connection is fails to be established or updated as in step S4.3, the 5G gNB will initiate a new satellite search process to discover a new relay satellite.

\* \* \* \* \*